United States Patent
Cheong et al.

(10) Patent No.: US 8,483,235 B2
(45) Date of Patent: Jul. 9, 2013

(54) APPARATUS AND METHOD FOR CHANNEL ESTIMATION IN MIMO SYSTEMS

(75) Inventors: Minho Cheong, Daejon (KR); Sok-Kyu Lee, Daejon (KR); Seung-Chan Bang, Daejon (KR); Il-Gu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1170 days.

(21) Appl. No.: 12/332,001

(22) Filed: Dec. 10, 2008

(65) Prior Publication Data
US 2009/0190686 A1 Jul. 30, 2009

(30) Foreign Application Priority Data

Dec. 11, 2007 (KR) .......................... 10-2007-0128377
Aug. 13, 2008 (KR) .......................... 10-2008-0079426

(51) Int. Cl.
*H04J 4/00* (2006.01)
*H04J 1/00* (2006.01)
(52) U.S. Cl.
USPC .............................. 370/436; 370/478; 370/480
(58) Field of Classification Search
None
See application file for complete search history.

(56) References Cited

U.S. PATENT DOCUMENTS

| | | | |
|---|---|---|---|
| 7,408,976 B1 * | 8/2008 | Narasimhan et al. | 375/148 |
| 8,045,657 B2 * | 10/2011 | Xiang | 375/344 |
| 2004/0076246 A1 * | 4/2004 | Vanderperren et al. | 375/343 |
| 2005/0180312 A1 * | 8/2005 | Walton et al. | 370/208 |
| 2006/0050802 A1 * | 3/2006 | Kim et al. | 375/260 |
| 2006/0062196 A1 * | 3/2006 | Cai et al. | 370/345 |
| 2006/0088112 A1 * | 4/2006 | Das et al. | 375/260 |
| 2007/0064828 A1 | 3/2007 | Aldana et al. | |
| 2007/0280394 A1 * | 12/2007 | Fung et al. | 375/362 |
| 2008/0101495 A1 * | 5/2008 | Gaikwad | 375/267 |
| 2010/0046402 A1 * | 2/2010 | Forck et al. | 370/280 |

FOREIGN PATENT DOCUMENTS

| | | |
|---|---|---|
| KR | 10-0346205 | 2/2001 |
| KR | 10-2005-0002207 A | 1/2005 |
| KR | 10-2007-0020505 A | 2/2007 |
| KR | 10-2007-0106616 A | 11/2007 |

OTHER PUBLICATIONS

U.S. Appl. No. 60/995,491, Xiang, filed Sep. 26, 2007, pp. 3 and 5.*

* cited by examiner

*Primary Examiner* — Chirag Shah
*Assistant Examiner* — Ashley Shivers
(74) *Attorney, Agent, or Firm* — Kile Park Reed & Houtteman PLLC

(57) ABSTRACT

Provided are a preamble structure and a channel estimation algorithm thereof. A communication method for a transmitter for channel estimation in a Multiple Input Multiple Output (MIMO) wireless communication system having N receiving antennas, includes generating a preamble interval having a short training field that includes a predetermined pattern iterated N times on a time domain and is used for compensating for a carrier frequency offset, and transmitting a packet having the preamble interval.

10 Claims, 18 Drawing Sheets

510

510

APPARATUS AND METHOD FOR CHANNEL ESTIMATION IN MIMO SYSTEMS

CROSS-REFERENCE TO RELATED APPLICATIONS

The present invention claims priority of Korean Patent Application Nos. 10-2007-0128377 and 10-2008-0079426, filed on Dec. 11, 2007, and Aug. 13, 2008, respectively, which are incorporated herein by reference.

BACKGROUND OF THE INVENTION

1. Field of the Invention

The present invention relates to the channel estimation of a Multiple Input Multiple Output (MIMO) wireless communication system; and, more particularly, to a preamble structure designed to be robust against a timing offset in the channel estimation of an MIMO wireless communication system, and a channel estimation algorithm thereof.

2. Description of Related Art

Many researches have been made for overcoming the limitations of International Mobile Telecommunications 2000 (IMT-2000) and for establishing the fourth generation mobile communication network. The fourth generation mobile communication network is a heterogeneous communication network, not a homogenous communication network. For example, the fourth generation mobile communication network integrally includes various types of communication networks for satellite communication, wireless Local Area Network (LAN), and digital broadcasting.

International Telecommunication Union (ITU) defines that the fourth generation wireless communication supports a transmission rate of approximately 110 Mpbs while moving and a transmission rate of 1 Gpbs while not moving.

Recently, IEEE 802.11b, IEEE 802.11a, IEEE 802.11g, and IEEE 802.11n have been used as a wireless LAN specification. Particularly, a wireless LAN employing IEEE 802.11b or IEEE 802.11g has been popular. IEEE 802.11g supports up to a transmission rate of approximately 54 Mbps in a bandwidth of 2.4 GHz. IEEE 802.11n is currently in development and it is expected that IEEE 802.11n will support up to a transmission rate of approximately 540 Mpbs although it could not support a transmission rate of 1 Gbps which is required in the fourth generation wireless communication. In order to realize such high speed wireless communication, core technologies, Orthogonal Frequency Division Multiplexing (OFDM) and Multiple-Input Multiple-Output (MIMO), were introduced.

NTT DoCoMo Inc. predicted that Orthogonal Frequency Code Division Multiplexing (OFCDM) and OFDM will be used as a core technology for the fourth generation wireless communication. The OFCMD and OFDM have better performance than Direct Sequence-Code Division Multiple Access (DS-CDMA) based wireless communication access which has been used for a communication system using a wideband channel. In case of a wideband channel, it is possible to significantly reduce performance deterioration caused by the interference of multipath in OFCDM or OFDM.

Meanwhile, it is required to improve the spectral efficiency in order to increase a transmission rate with a frequency resource limited. As one of methods for improving the spectral efficiency, an MIMO technology has been used. Also Bell Laboratories Layered Space Time (BLAST) was used to use the MIMO technology. It has been widely known that the BLAST has better performance than that of Maximum Likelihood Detection (MLD) and Minimum Mean Squared Error (MMSE) in view of Bit Error Rate (BER) or Block Error Rate (BLER). However, it is not suitable to embody the MLD in a communication system because the BLAST has high computational complexity that exponentially increases according to a modulation scheme or the number of antennas. In order to reduce the high computational complexity of the MLD, MLD with QR decomposition and M-algorithm (ORM-MLD) was introduced. The ORM-MLD is MLD using the M-algorithm and QR decomposition. Although the ORM-MLD has the lower computational complexity than that of the MLD, there is a margin to improve the ORM-MLD.

As described above, the MIMO technology and multiple frequency bands are essentially necessary for high speed wireless communication that supports a transmission rate faster than that of the fourth generation wireless communication. Accordingly, it is necessary to develop an effective channel estimation method suitable to a wireless communication system using MIMO and multiple frequency bands. Also, a timing offset may significantly influence the performance of an MIMO wireless communication system. In this case, channel estimation may deteriorate the performance thereof. Therefore, it is also required to develop a channel estimation algorithm for improving the performance deterioration problem of the channel estimation.

SUMMARY OF THE INVENTION

An embodiment of the present invention is directed to providing a preamble structure suitable for a Multiple Input Multiple Output (MIMO) wireless communication system for effective channel estimation in an MIMO wireless communication system.

Another embodiment of the present invention is directed to providing prevention of performance deterioration caused by a timing offset in an MIMO wireless communication system.

In accordance with an aspect of the present invention, there is provided a communication method of a transmitter for channel estimation in an MIMO wireless communication system having N receiving antennas, including: generating a preamble interval having a short training field that includes a predetermined pattern iterated N times on a time domain and is used for compensating for a carrier frequency offset; and transmitting a packet having the preamble interval.

In accordance with another aspect of the present invention, there is provided a communication method of a transmitter for channel estimation in an MIMO wireless communication system, including: generating a preamble interval for compensating for a phase error caused by a sampling frequency offset; and transmitting a packet having the preamble interval and a data interval.

In accordance with another aspect of the present invention, there is provided a communication method of a transmitter for channel estimation in a multiple input multiple output (MIMO) wireless communication system, including: generating a preamble interval including more than two identical long training fields consecutive on a time domain in order to compensate for a carrier frequency offset; and transmitting a packet having the preamble interval.

In accordance with another aspect of the present invention, there is provided a communication method of a transmitter for channel estimation in an MIMO wireless communication system having M transmitting antennas, including: generating a preamble interval having a long training field; and loading a packet having the preamble interval on a plurality of subcarriers that orthogonally cross each other and transmitting the packet, wherein a pilot for channel estimation is allocated in the long training field corresponding to more than 1/M subcarriers among the plurality of subcarriers.

In accordance with yet another aspect of the present invention, there is provided a communication method of a receiver for channel estimation in an MIMO wireless communication system having N receiving antennas, including: receiving a packet including a preamble interval having a short training field that has predetermined patterns repeatedly arranged on a time domain; and compensating for a carrier frequency offset using more than two of the predetermined patterns.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

Figure 1:
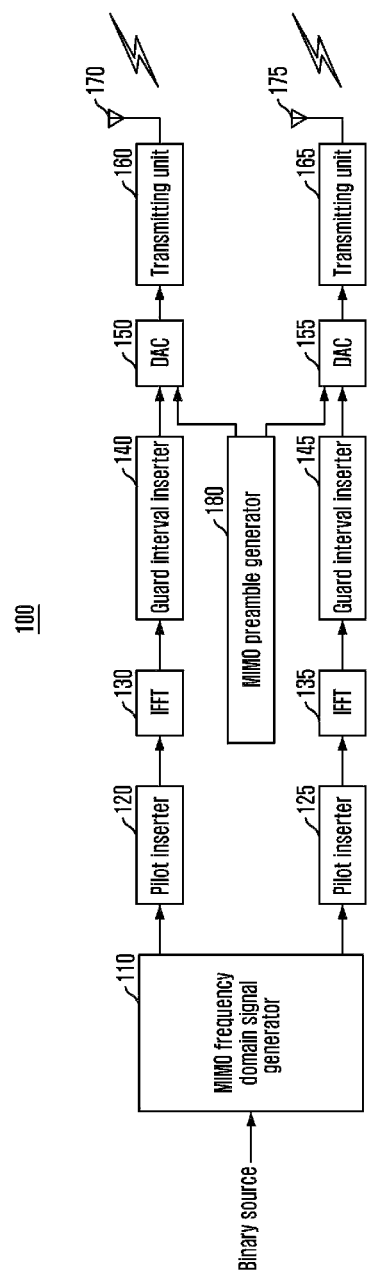
FIG. 1 is a block diagram illustrating a transmitter used in an MIMO wireless communication system in accordance with an embodiment of the present invention.

The advantages, features and aspects of the invention will become apparent from the following description of the embodiments with reference to the accompanying drawings, which is set forth hereinafter.

Lately, Electronics and Telecommunications Research Institute (ETRI) introduced a new Nomadic Local area wireless Access (NoLA) system. The NoLA system supports a transmission rate of the fourth wireless communication by employing the MIMO technology and the OFDM technology. The NoLA system employs the MIMO technology using four or eight transmission antennas and eight reception antennas and guarantees a transmission rate of 3.6 Gbps using three 40 MHz frequency bands which are equivalent to total 120 MHz frequency band.

The NoLA system has following four features. At first, the NoLA system uses the MIMO technology. The MIMO technology is a method for gaining high spectral efficiency through antenna diversity. Such an MIMO technology has been widely used for high speed wireless communication such as IEEE 802.11g and IEEE 802.11n. In case of IEEE 802.11n, four transmission antennas and four reception antennas are used. However, the NoLA system maximally uses the eight transmission antennas and eight reception antennas in order to provide a further higher transmission rate. Although the transmission rate can be improved using the large number of antennas, complexity may significantly increase in a receiving end such as a detector.

A second feature of the NoLA system uses Model Driven Development (MDD) that was introduced by a next generation wireless LAN team of ETRI in order to overcome the complexity increment problem. Therefore, the NoLA system gains data with high reliability using the less number of antennas and improves a reception rate through eliminating the interference of data received from a plurality of antennas through Successive Interference Cancellation (SIC).

As a third feature, the NoLA system uses a Low Density Parity Check (LDPC) code based on a channel coding scheme. Since the LDPC code allows parallel processing, it is suitable to process data that is transmitted at a high speed such as 3 Gbps.

As the fourth feature, the NoLA system uses OFDM which has been actively developed as a transmission scheme for high speed data transmission in a wired/wireless channel. The OFDM may improve spectral efficiency because the OFDM uses a plurality of carriers having orthogonality. Since the modulation/demodulation of a plurality of carriers in a transmitter or a receiver is equivalent to performing of Inverse Discrete Fourier Transform (IDFT) and Discrete Fourier Transform (DFT), it is possible to realize high speed modulation/demodulation of the plurality of carriers through IFFT/FFT. Since the OFDM is suitable for high speed data transmission, the OFDM was selected as standard for high speed wireless LAN such as IEEE 802.11a and HIPELAN/2, wideband wireless access of IEEE 802.16, digital audio broadcasting, digital terrestrial television broadcasting, asymmetric digital subscriber line (ADSL), and very high-speed digital subscriber line (VDSL).

FIG. 1 is a block diagram illustrating a transmitter 100 in an MIMO wireless communication system in accordance with an embodiment of the present invention. In FIG. 1, the transmitter 100 includes two transmission antennas 170 and 175. However, the transmitter 100 may include more than three transmission antennas.

Referring to FIG. 1, the transmitter 100 includes an MIMO frequency domain signal generator 110, pilot inserters 120 and 125, Inverse Fast Fourier Transform (IFFT) units 130 and 135, guard interval inserters 140 and 145, digital-to-analog converters (DAC) 150 and 155, transmitting units 160 and 165, transmission antennas 170 and 175, and an MIMO preamble generator 180.

The MIMO frequency domain signal generator 110 receives a binary source from a Medium Access Control layer (MAC), encodes the received binary source, and generates an MIMO frequency domain signal by mapping the encoded bits to subcarriers. The pilot inserters 120 and 125 insert pilot into signals of each transmission branches, and the IFFT units 130 and 135 transform the pilot inserted signals into time domain waveform. The guard interval inserters 140 and 145 insert guard intervals (GI) in front of each OFDM symbol in the time domain signal, and the MIMO preamble generator 180 generates a signal packet with a preamble interval. The DACs 150 and 155 convert the generated signal packet from digital to analog and the transmitting units 160 and 165 transmit the analog signals through the transmission antennas 170 and 175.

Figure 2:
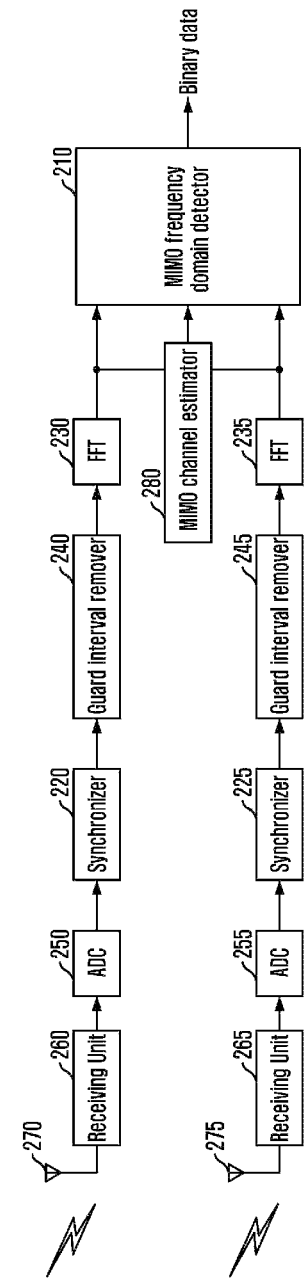
FIG. 2 is a block diagram illustrating a receiver of an MIMO wireless communication system in accordance with an embodiment of the present invention.

FIG. 2 is a diagram illustrating a receiver 200 used in an MIMO wireless communication system in accordance with an embodiment of the present invention. In FIG. 2, the receiver 200 includes two reception antennas 270 and 275. However, the receiving device 200 may include more than three reception antennas.

Referring to FIG. 2, the receiver 200 includes reception antennas 270 and 275, analog-to-digital converters (ADC) 250 and 255, synchronizers 220 and 225, guard interval removers 240 and 245, FFT units 230 and 235, an MIMO frequency domain detector 210, and an MIMO channel estimator 280.

The receiver 200 processes signals received through two reception antennas 270 and 275 using corresponding receiving units 260 and 265. The ADCs 250 and 255 converts the processed signals to digital signals. The synchronizers 220 and 225 use the processed signals to extract a frequency and synchronization information. After the guard interval removers 240 and 245 remove the guard interval from the processed signals, the FFT units 230 and 235 transform the guard interval removed signal to a frequency domain. The MIMO channel estimator 280 performs channel estimation using the frequency domain signal. The channel estimation of the MIMO channel estimator 280 includes the compensation of Carrier Frequency Offset (CFO), the compensation of Sampling Frequency Offset (SFO), and the extraction of channel information. The receiver 200 detects the MIMO frequency domain by de-mapping and decoding the frequency domain signal using channel information of the MIMO channel estimator 280 and restores binary data.

Figure 3:
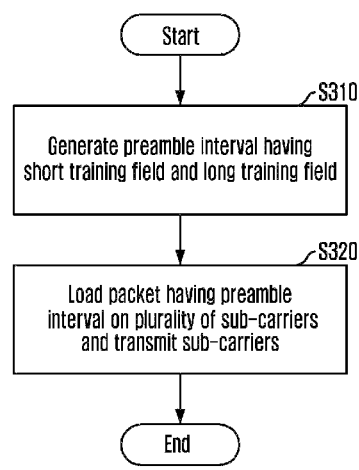
FIG. 3 is a flowchart describing a communication method applied to a transmitter for channel estimation in an MIMO wireless communication system in accordance with an embodiment of the present invention.

FIG. 3 is a flowchart illustrating a communication method applied to a transmitter for channel estimation in an MIMO wireless communication system in accordance with an embodiment of the present invention. Hereafter, a communication method applied to the transmitter 100 according to the present embodiment will be described with reference to FIGS. 3 and 1.

Figure 4:
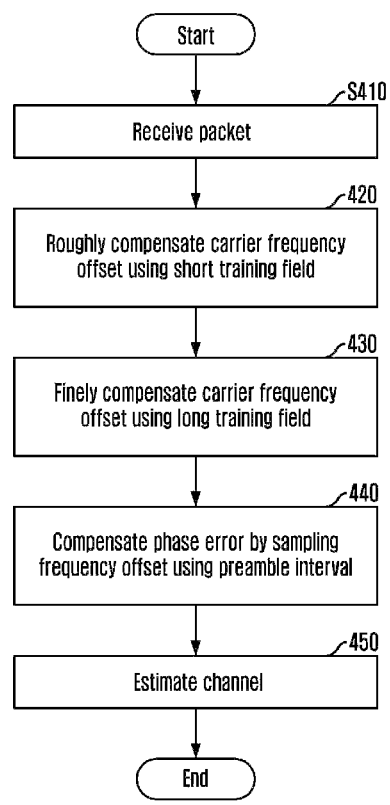
FIG. 4 is a flowchart describing a communication method applied to a receiver for channel estimation in an MIMO wireless communication system in accordance with an embodiment of the present invention.

The transmitter 100 generates a preamble interval having a short training field and a long training field at step S310. The signal having the short training field, the long training field and a pilot is configured to be suitable to an MIMO wireless communication system as shown in FIG. 4. Then, the transmitter 100 loads a packet having the generated preambles on a plurality of sub-carriers that cross orthogonally and transmits the packet at step S320. Here, the packet is transmitted through a plurality of transmission antennas, and 256 sub-carriers are used.

FIG. 4 is a flowchart of a communication method applied to a receiver for channel estimation in an MIMO wireless communication system in accordance with an embodiment of the present invention. Hereinafter, the communication method applied to the receiver 200 according to the present embodiment will be described with reference to FIGS. 2 and 4.

The receiver 200 receives packets transmitted from the transmitter 100 through a wireless channel. The receiver 200 obtains original data from the received packets. Since the wireless channel has a channel state irregularly changing on a time domain and a frequency domain, the receiver 200 performs channel estimation for detecting information on the wireless channel state such as signal attenuation, signal delay, and phase shift. Before performing the channel estimation, the receiver 200 compensates the received packet for a frequency offset. The frequency offset includes a subcarrier frequency offset and a sampling frequency offset.

The subcarrier frequency offset means the distortion of received signal, which is caused by the incorrect prediction of a subcarrier frequency. The subcarrier frequency offset causes phase variation and Inter-Carrier Interference (ICI). Particularly, since phase variation may cause serious performance deterioration, it is very important to correct distorted phase.

The subcarrier frequency offset increases in proportion to a time. Therefore, if the transmitter transmits data like Eq. 1, data received at the receiver include a phase error like Eq. 2 due to the subcarrier frequency offset.

$$a_1 a_2 a_3 a_4 \ldots a_{35} a_{36} \qquad \text{Eq. 1}$$

$$a_1 e^{j2\pi\epsilon 1} a_2 e^{j2\pi\epsilon 2} a_3 e^{j2\pi\epsilon 3} a_4 e^{j2\pi\epsilon 4} \ldots a_{35} e^{j2\pi\epsilon 35} a_{36} e^{j2\pi\epsilon 36} \qquad \text{Eq. 2}$$

In Eq. 2, $\epsilon$ denotes a carrier frequency offset and having a unit of 'ppm'. For example, when a carrier frequency of 5 GHz, a carrier frequency offset of 10 ppm becomes 40 kHz. In a simulation, the carrier frequency offset can be simply modeled by multiplying $e^{j2\pi\epsilon 1}$ (m=0, 1, 2, . . . ) to data on a time domain.

The receiver 200 cannot use channel information in a preamble interval because the receiver 200 estimates a channel using a long training field of a preamble. Therefore, the preamble interval must include data that is repeated at a time domain in order to estimate and correct a carrier frequency offset in the preamble interval. In order to compensate for an error caused by the carrier frequency offset, the receiver performs an offset compensation twice, for example, a coarse carrier frequency offset compensation and a fine carrier frequency offset operation. The two offset compensation operations use repeated patterns in a short training field and repeatedly disposed long training fields.

As shown in FIG. 4, the receiver 200 receives a packet transmitted from the transmitter 100 for channel estimation at step S410. The receiver 200 corrects a phase error caused by a coarse carrier frequency offset using a short training field of the received packet at step S420. Then, the receiver 200 corrects a phase error caused by a fine carrier frequency offset using the long training fields at step S430. The receiver 200 corrects the phase error caused by the sampling frequency offset using the preamble interval of the received packet at step S440. After correcting the frequency offsets at the steps S420, S430, and S440, the receiver 220 detects information of a wireless channel through the channel estimation 450 and continuously receives signals based on the channel information.

Figure 5:
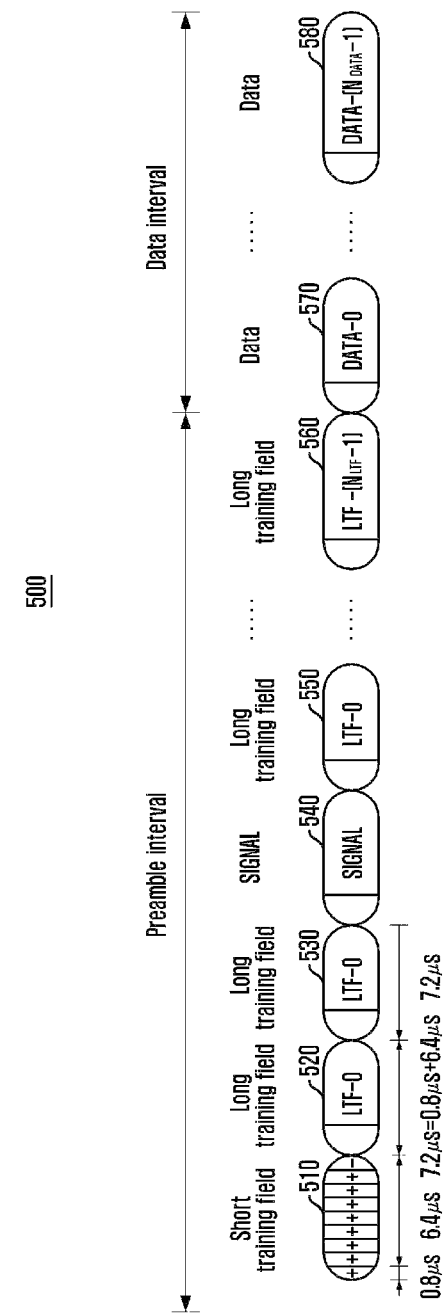
FIG. 5 is a diagram illustrating a structure of a packet for channel estimation in an MIMO wireless communication system in accordance with an embodiment of the present invention.

FIG. 5 is a diagram illustrating a structure of a packet for channel estimation in an MIMO wireless communication system in accordance with an embodiment of the present invention. As shown, a packet according to the present embodiment is divided into a preamble interval and a data interval. The preamble interval is used for synchronization, offset compensation, and channel estimation. The data interval includes data to transmit. The preamble interval includes a Short Training Field (STF), Long Training Fields (LTF), and a signal field.

The STF 510 is used for synchronization and coarse carrier frequency offset compensation. The STF 510 includes a repeated pattern. The length of the repeated pattern may be 0.8 μs which is ⅛ of each OFDM symbol length.

The LTFs 520, 530, 550, and 560 are used for fine Carrier frequency offset compensation and channel estimation. The packet includes LTFs 520, 530, 550, and 56C as many as the number of transmission antennas. Each of LTFs is indicated by attaching numbers after LTF, for example, LTF-0, LTF-1, . . . , LTF-($N_{LTF}$−1). For example, if the number of transmission antennas is 8, the packet includes LTFs LTF-0 to LTF-7.

The preamble interval according to the present embodiment includes a short training field 510, one type of long training fields 520 and 530, a signal field 540, and other type of long training fields 550 and 560 in sequence. Although the one type of long training fields 520 and 530 are repeated two times in FIG. 5, the long training fields 520 and 530 may be repeated more than two times. Here, each of symbols 510, 520, 530, 540, 560, 570, and 580 has a constant length. For example, each symbol has a length of 7.2 μs. It is a length of an OFDM symbol length (6.4 μs) with a guard interval length (0.8 μs). Each symbol may include a guard interval of 0.8 μs in front of the symbol, and the guard interval includes a part of a symbol repeated by a cyclic prefix.

Meanwhile, the wireless communication system according to the present embodiment can use a plurality of subcarriers. Here, the wireless communication system according to the present embodiment may use 256 subcarriers. Among the 256 subcarriers, 228 subcarriers are allocated with data in a data interval. The remaining subcarriers are allocated with a pilot or with '0' for removing interference and eliminating signal intensity variation caused by Direct Current (DC).

Figure 6:
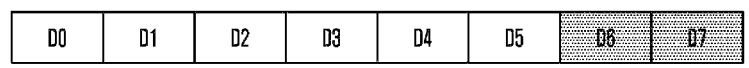
FIG. 6 is a diagram illustrating a short training field shown in FIG. 5.
Figure 7:
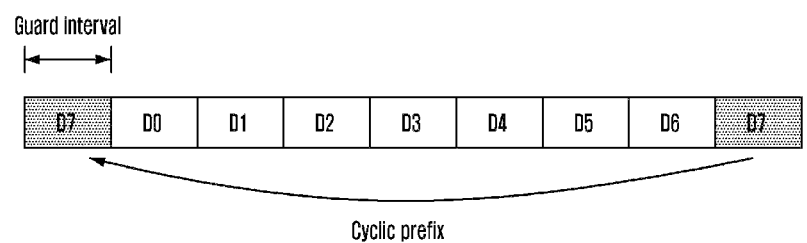
FIG. 7 is a diagram illustrating a guard interval included in a short training field shown in FIG. 5.

FIGS. 6 and 7 are diagrams illustrating a short training field 510 shown in FIG. 5. As shown in FIG. 6, the short training field 510 includes predetermined patterns D0 to D7 at a time domain. Here, the number of patterns is identical to the number of reception antennas or transmission antennas. In FIG. 6, the short training field 510 includes 8 patterns for 8 reception antennas or 8 transmission antennas.

Basically, the same pattern is repeatedly disposed at D0 to D7 for a coarse carrier frequency offset compensation operation. That is, since it is necessary to have a signal repeated at a time domain for the carrier frequency offset compensation operation as described above, the patterns D0 to D7 are formed of the same bit sequence. The length of the patterns D0 to D7 may be 0.8 μs which is ⅛ of the OFDM symbol length.

The receiver 200 performs the coarse carrier frequency offset compensation operation using the last two patterns D6 and D7 among the repeated patterns of the short training field 510. The receiver 200 increases α obtained through Eq. 3 in proportional to a time and corrects a phase error like Eq. 4. The length of patterns repeated in the short training field 510 may be 0.8 μs, and it is equivalent to 32 data.

$$\alpha = \frac{\arctan\left[\sum_{m=0}^{31} a_m a_{m+32}^*\right]}{32} \quad \text{Eq. 3}$$

$$= \frac{\arctan\left[\sum_{m=0}^{31} h_m e^{j2\pi m \varepsilon}(h_{m+32} e^{j2\pi(m+32)\varepsilon})^*\right]}{32}$$

$$a_1 e^{j2\pi\varepsilon 1} a_2 e^{j2\pi\varepsilon 2} a_3 e^{j2\pi\varepsilon 3} a_4 e^{j2\pi\varepsilon 4} \ldots a_{35} e^{j2\pi\varepsilon 35} \quad \text{Eq. 4}$$
$$a_{36} e^{j2\pi\varepsilon 36} \ldots 2a_1 e^{j2\pi\varepsilon 1}(e^{j\alpha 1}) * a_2 e^{j2\pi\varepsilon 2}(e^{j\alpha 2}) *$$
$$a_3 e^{j2\pi\varepsilon 3}(e^{j\alpha 3}) * \ldots a_{35} e^{j2\pi\varepsilon 35}(e^{j\alpha 35}) * a_{36} e^{j2\pi\varepsilon 36}(e^{j\alpha 36}) *$$

Meanwhile, a cyclic prefix is used in a guard interval for preventing inter-carrier interference and inter-symbol interface (ISI) which are generated due to delay spread in a wireless communication system using OFDM. Therefore, the short training field 510 may include a guard interval at the front thereof, and a part of the short training field 510 is repeated in the guard interval. Since a back part of the short training field 510 is generally repeated in the guard interval, more than one of repeated patterns for coarse carrier frequency compensation may be included in the guard interval. In case of FIG. 7, since the short training field 510 is for a system having eight reception antennas or eight transmission antennas and one of repeated patterns is included in a guard interval, nine repeated patterns including patterns in the guard interval are included. Here, the length of the guard interval may be ⅛ of the OFDM symbol cycle which is 6.4 μs.

The last repeated pattern of the short training field 510 shown in FIG. 6 or FIG. 7 may be disposed in reverse order of other repeated patterns for efficient synchronization.

At a frequency domain, 256 subcarriers are allocated at a short training field 510 like Eq. 5.

$$STF_{-117:117} = \quad \text{Eq. 5}$$

$$\sqrt{1/2} \begin{Bmatrix} 0, 0, 0, 0, 0, 1+j, 0, 0, 0, 0, 0, 0, 0, 1+ \\ j, 0, 0, 0, 0, 0, 0, 0, -1-j, 0, 0, 0, 0, 0, 0, 0, 1+ \\ j, 0, 0, 0, 0, 0, 0, 0, -1-j, 0, 0, 0, 0, 0, 0, 0, -1- \\ j, 0, 0, 0, 0, 0, 0, 0, -1-j, 0, 0, 0, 0, 0, 0, 0, -1- \\ j, 0, 0, 0, 0, 0, 0, 0, 1+j, 0, 0, 0, 0, 0, 0, 0, 1+ \\ j, 0, 0, 0, 0, 0, 0, 0, 1-j, 0, 0, 0, 0, 0, 0, 0, 1+ \\ j, 0, 0, 0, 0, 0, 0, 0, 1+j, 0, 0, 0, 0, 0, 0, 0, -1- \\ j, 0, 0, 0, 0, 0, 0, 0, 0, 0, 0, 0, 0, 0, 0, 0, 1+ \\ j, 0, 0, 0, 0, 0, 0, 0, -1-j, 0, 0, 0, 0, 0, 0, 0, 1+ \\ j, 0, 0, 0, 0, 0, 0, 0, -1-j, 0, 0, 0, 0, 0, 0, 0, -1- \\ j, 0, 0, 0, 0, 0, 0, 0, 1+j, 0, 0, 0, 0, 0, 0, 0, -1- \\ j, 0, 0, 0, 0, 0, 0, 0, -1-j, 0, 0, 0, 0, 0, 0, 0, 1+ \\ j, 0, 0, 0, 0, 0, 0, 0, 1+j, 0, 0, 0, 0, 0, 0, 0, 1+ \\ j, 0, 0, 0, 0, 0, 0, 0, 1+j, 0, 0, 0, 0, 0, 0, 0, -1- \\ j, 0, 0, 0, 0, 0, 0, 0, -1-j, 0, 0, 0, 0, 0 \end{Bmatrix}$$

For example, in case of a wireless communication system using three frequency bands, a sequence of Eq. 5 is allocated to a middle frequency band among three frequency bands which are a high frequency band, a middle frequency band, and a low frequency band. 256 subcarriers are allocated for each of the high frequency band and the low frequency band by applying +90° of a phase difference to the sequence of Eq. 5 and applying −90° of a phase difference to the sequence Eq. 5. Such a phase difference may reduce a peak to average power ration (PAPR).

A signal allocated to the short training field 510 may be expressed like Eq. 6 at a time domain.

$$r_{STF}^{(i_{TX})}(t) = \quad \text{Eq. 6}$$

$$\frac{1}{\sqrt{26}} W_{STF}(t) \cdot \left[ -j \sum_{k=-117-NFFT}^{117-NFFT} STF_{k+NFFT} \exp(j2\pi k\Delta_F(t - T_{CS}^{i_{TX}})) + \sum_{k=-117}^{117} STF_k \exp(j2\pi k\Delta_F(t - T_{CS}^{i_{TX}})) + \sum_{k=-117+NFFT}^{117+NFFT} STF_{k-NFFT} \exp(j2\pi k\Delta_F(t - T_{CS}^{i_{TX}})) \right]$$

In Eq. 6, NFFI denotes a size of FFT, and $W_{STF}(t)$ denotes a windowing function of a short training field 510. $\Delta_F$ and NS denote a gap between subcarriers and the number of streams. Also, $T_{CS}^{iTX}$ is defined by a cyclic prefix of the $i^{th}$ TX stream.

Figure 8:
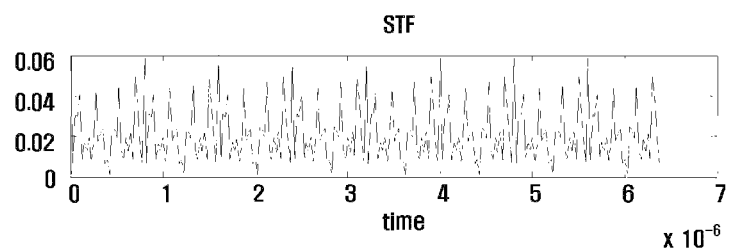
FIG. 8 is a diagram illustrating a waveform for a time response of a short training field in accordance with an embodiment of the present invention.

FIG. 8 is a graph showing a waveform for time response of a short training field 510 according to an embodiment of the present invention. If the short training field 510 is formed as shown in FIGS. 5 to 7, the same pattern is repeated at every 0.8 μs. Therefore, the same waveform is appeared at every 0.8 μs in a time response of the short training field 510 as shown in FIG. 8.

Figure 9:
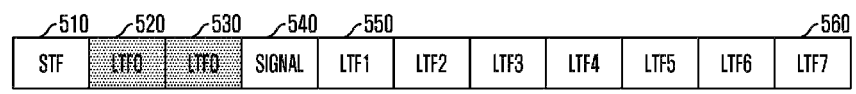
FIG. 9 is a diagram illustrating a preamble interval shown in FIG. 5.

FIG. 9 is a diagram illustrating a preamble interval of FIG. 5.

A signal repeated at a time domain is required in the preamble interval for fine carrier frequency offset estimation. Accordingly, more than two long training fields 520 and 530 are consecutively disposed after the short training field 510. The long training fields 520, 530, 540, 550, and 560 are also used for channel estimation for decoding signals.

A signal field 540 is disposed after the repeated long training fields 520 and 530, and other long training fields LTF1 to LTF7 are disposed after the signal field 540. Since a wireless communication system having eight reception antennas is shown in FIG. 9, the types of the long training fields are total 8 LTF0 to LTF7 as described above.

Although the receiver performs the coarse carrier frequency offset compensation operation using the short training field, the offset compensation using the short training field may be weak to noise because a length of repeated patterns included in the short training field is short. Therefore, a fine sub-carrier frequency offset compensation operation is performed using the long training fields 520 and 530 having long repeated signals. Like the coarse sub-carrier frequency offset compensation operation, a phase error caused by sub carrier frequency offset is compensated for by increasing a calculated through Eq. 7 in proportional to a time. The length of the repeated long training field may be 6.4 μs which is an OFDM symbol length, and it is equivalent to 256 data.

$$\alpha = \frac{\arctan\left[ \sum_{m=0}^{255} a_m a_{m+256}^* \right]}{256} \quad \text{Eq. 7}$$

$$= \frac{\arctan\left[ \sum_{m=0}^{255} h_m e^{j2\pi m\varepsilon} (h_{m+256} e^{j2\pi(m+256)\varepsilon})^* \right]}{256}$$

At a frequency domain, 256 subcarriers are allocated to a long training field like Eq. 8.

$$LTF_{-117:117} = \quad \text{Eq. 8}$$

$$\begin{Bmatrix}
1, 1, -1, -1, 1, 1, -1, 1, -1, 1, 1, 1, 1, 1, \\
-1, -1, 1, 1, -1, 1, -1, 1, 1, 1, 1, 1, 1, -1, -1, \\
1, 1, -1, 1, -1, 1, -1, -1, -1, -1, -1, 1, 1, -1, -1, \\
1, -1, 1, -1, 1, 1, 1, 1, 1, -1, 1, -1, -1, 1, \\
-1, 1, -1, 1, 1, 1, -1, -1, 1, 1, -1, 1, -1, 1, 1, \\
1, 1, 1, 1, -1, -1, 1, 1, -1, 1, -1, 1, 1, 1, 1, \\
-1, 1, -1, -1, 1, 1, -1, 1, -1, 1, -1, -1, -1, -1, -1, \\
1, 1, -1, -1, 1, -1, 1, -1, 1, 1, 1, 0, 0, 0, 1, \\
1, 1, -1, 1, -1, 1, 1, -1, -1, 1, 1, -1, -1, -1, -1, \\
1, -1, 1, -1, 1, 1, -1, -1, 1, -1, 1, 1, 1, 1, -1, \\
1, -1, 1, 1, -1, -1, 1, 1, 1, 1, 1, 1, -1, 1, -1, \\
1, 1, -1, -1, 1, 1, -1, 1, 1, -1, 1, -1, 1, 1, -1, \\
1, 1, 1, 1, 1, 1, -1, 1, -1, 1, -1, 1, 1, 1, -1, \\
-1, -1, -1, -1, 1, -1, 1, -1, 1, 1, -1, -1, 1, 1, 1, \\
1, 1, 1, -1, 1, -1, 1, 1, -1, -1, 1, 1, 1, 1, 1, \\
1, -1, 1, -1, 1, 1, -1, -1, 1, 1
\end{Bmatrix}$$

Eq. 9 shows a signal allocated to a long training field at a time domain. Like Eq. 6, Eq. 9 shows a signal of a wireless communication system using three frequency bands. 256 subcarriers are allocated in each of the high frequency band and the low frequency band by applying +90° of a phase difference to the sequence of Eq. 8 and applying −90° of a phase difference to the sequence of Eq. 8. Such a phase difference reduces a peak to average ratio.

$$r_{STF}^{(n \cdot i_{TX})}(t) = \frac{1}{\sqrt{232}} W_{LTF}(t) \cdot \quad \text{Eq. 9}$$

$$\begin{bmatrix}
-j \sum_{k=-117-NFFT}^{117-NTTF} LTF_{(i_{TX} \bmod NS)k+NFFT} \exp\left( \frac{j2\pi k\Delta_F}{(t - T_{G1} - T_{CS}^{i_{TX}})} \right) + \\
\sum_{k=-117}^{117} LTF_{(i_{TX} \bmod NS)k} \exp\left( \frac{j2\pi k\Delta_F}{(t - T_{G1} - T_{CS}^{i_{TX}})} \right) + \\
\sum_{k=-117+NFFT}^{117+NTTF} LTF_{(i_{TX} \bmod NS)k-NFFT} \exp\left( \frac{j2\pi k\Delta_F}{(t - T_{G1} - T_{CS}^{i_{TX}})} \right)
\end{bmatrix}$$

In Eq. 9, $w_{LTF}(t)$ denotes a window function for a long training field on a time axis, and $T_{G1}$ denotes a length of a cyclic prefix Also, $LTF_{(i_{TX} \bmod NS)k}$ can be expressed like Eq. 10.

$$LTF_{(i_{TX} \bmod NS),k} = \begin{cases} LTF_k, & \text{if } |k| \in \{(x \bmod NS) = i_{TX} - 1\} \\ 0, & \text{else} \end{cases} \quad \text{Eq. 10}$$

Figure 10:
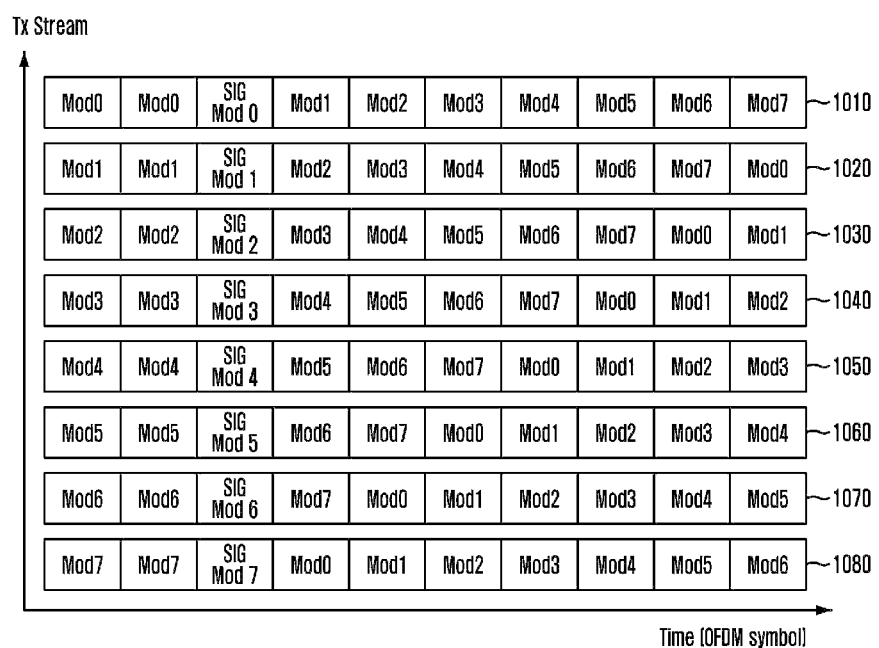
FIG. 10 is a layout of long training fields according to 8 transmitting antennas and time in an MIMO wireless communication system in accordance with an embodiment of the present invention.

FIG. 10 is a diagram illustrating arrangement of long training fields according to a time and eight transmission antennas in an MIMO wireless communication system in accordance with an embodiment of the present invention. In FIG. 10, one Mod denotes a symbol of one long training field. As shown in FIG. 10, a first transmission stream ($T_x$ stream) 1010 transmitted through the first transmission antenna includes a long training signal sequence Mod0 that is repeated twice, a signal field SIG Mod0, other long training signal sequences Mod1 to Mod7. A second transmission stream 1020 transmitted through a second transmission antenna and an eighth transmission stream 1080 transmitted through an eight transmission antenna include a signal that is iterated with an index increased one by one although the signal has the same structure of the first transmitting stream 1010.

Figure 11:
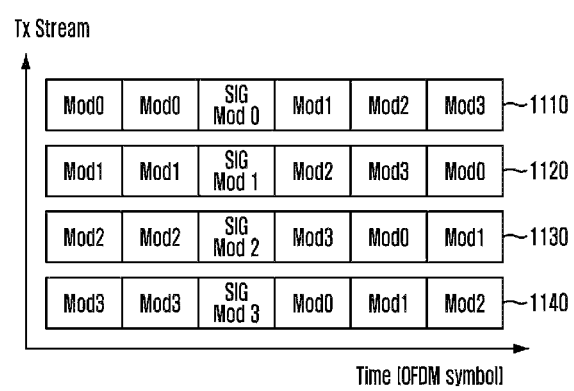
FIG. 11 is a layout of long training fields according to a time and four transmission antennas in an MIMO wireless communication system in accordance with an embodiment of the present invention.

FIG. 11 is a layout of a long training field sequence according to a time and four transmission antennas in an MIMO wireless communication system according to an embodiment of the present invention. In case of using four transmission antennas, four types of long training fields are disposed. Therefore, Mod0 to Mod3 are arranged as described above. That is, the first transmitting stream 1110 includes a long training field Mod0 repeated twice, a signal field SIG Mod0, and other long training fields Mod1 to Mod3. The remaining transmitting streams include a signal iterated with an index increased one by one.

Figure 12:
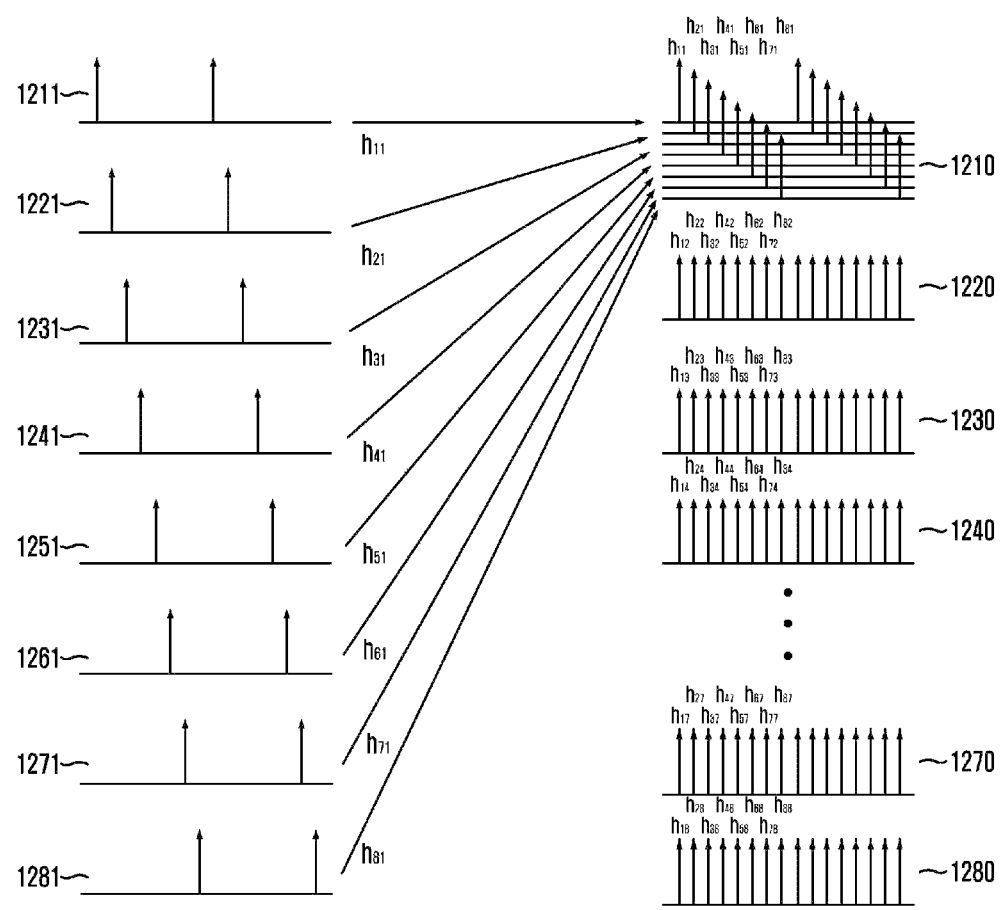
FIG. 12 is a diagram illustrating channel estimation in an MIMO wireless communication system according to an embodiment of the present invention.

FIG. 12 is a diagram illustrating channel estimation in an MIMO wireless communication system according to an embodiment of the present invention.

In case of a wireless communication system using eight transmission antennas and eight reception antennas, it is possible to perform accurate channel estimation without interference between subcarriers if a pilot is allocated to ⅛ of subcarriers among a plurality of subcarriers and "0" is allocated to all other subcarriers. As shown, in a signal received by the first reception antenna 1210, pilots transmitted from the first transmission antenna 1211 to the eight transmission antennas 1281 are sequentially arranged. Then, a pilot transmitted by the first transmission antenna 1211 is arranged. As shown in FIG. 12, if pilots are transmitted through eight transmission antennas 1211, 1221, 1231, 1241, 1251, 1261, 1271, and 1281, a receiver receives the pilots and can estimate channel information by obtaining impulse response of a channel using the received pilots because the receiver already knows about the transmitted pilot. Here, there may be total 64 channels by multiplying eight transmission antennas and eight reception antennas. In case of using a plurality of subcarriers, it is possible to obtain information of 64 channels for each subcarriers by performing the channel estimation as described above. As another example, in case of a wireless communication system using four transmission antennas, a pilot is allocated only to ¼ of subcarriers among the plurality of subcarriers, "0" is allocated to all of remaining subcarriers.

Hereinafter, a sampling frequency offset will be described with reference FIGS. 13 and 14.

Figure 13:
FIG. 13 is a graph showing a sampling period in accordance with an embodiment of the present invention.

FIG. 13 is a graph showing a sampling period in a transmitter and a receiver. In FIG. 13, a solid line denotes a sampling period in a transmitter, and a dotted line denotes a sampling period in a receiver. The sampling frequency offset is a difference between the sampling period in the transmitter and the sampling period in the receiver as shown in FIG. 13. The sampling frequency offset weakens the intensity of a signal, changes a phase in a frequency domain, and causes interference between sub-carriers.

Figure 14:
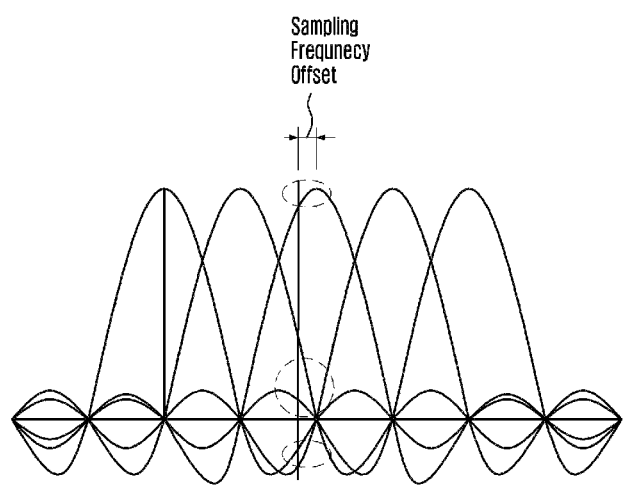
FIG. 14 is a graph showing a sampling frequency offset in accordance with an embodiment of the present invention.

The sampling frequency offset is generated using a Sinc function as shown in FIG. 14. In case of no sampling frequency offset generated, a signal is not distorted because data is multiplied with the center value of one Sinc function. However, if a sampling frequency offset is generated, data is slightly deviated from the center of the Sinc function. Therefore, the data is influenced by other data, and the signal is distorted.

Figure 15:
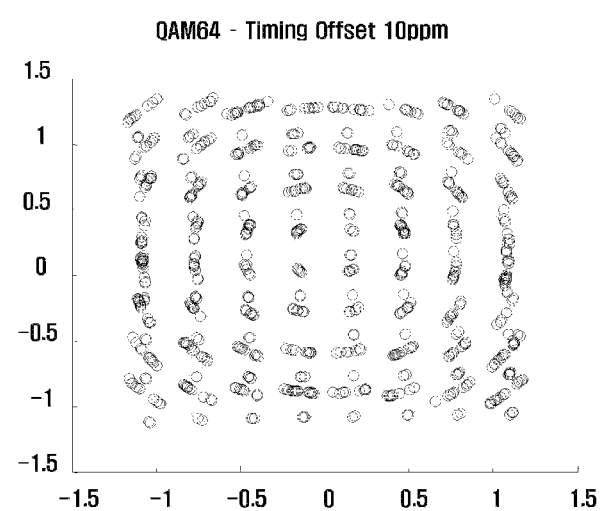
FIG. 15 is a constellation showing a phase error generated by a sampling frequency offset in accordance with an embodiment of the present invention.

FIG. 15 is a constellation showing a phase error generated by a sampling frequency offset in accordance with an embodiment of the present invention.

$$s(t - \Delta T)F \to s(f)e^{j2\pi Tf} \quad \text{Eq. 11}$$

$$f = \frac{f_s n}{N}$$

$$\Delta T = \varepsilon T_s$$

$$2\pi f m \Delta T = 2\pi \frac{f_s n}{N} m \varepsilon T_s$$

A phase error caused by a sampling frequency offset in a frequency domain can be calculated using Eq. 11. Eq. 12 shows a maximum phase error of a data symbol in a frequency domain, which is calculated by Eq. 11. Here, 128 is substituted for n, 2880 is substituted for m, and 256 is substituted for N.

i) $\epsilon$=30 ppm→15.5 (degree)

ii) $\epsilon$=20 ppm→10.4 (degree)

iii) $\epsilon$=20 ppm→10.4 (degree)     Eq. 12

If a sampling frequency offset is about 30 ppm, a phase error may become about 15.5 as shown in Eq. 12. As a result, the performance of a wireless communication system may be seriously deteriorated by the phase error. Therefore, it is necessary to properly compensate for the sampling frequency offset. However, it is difficult to calculate an accurate phase error using pilots in a data interval because a phase error is already generated when a receiver performs channel estimation using a preamble interval. Therefore, it is also necessary to compensate for a sampling frequency offset from a preamble interval by tracking the sampling frequency offset in the preamble interval. That is, there may be three methods for correcting an error caused by a sampling frequency offset using a preamble interval shown in FIG. 4.

As a first method, a long training field, which is iterated and arranged in a preamble interval for compensating for a carrier frequency offset, is additionally disposed at the end of the preamble interval, and a phase error is calculated using the additionally disposed long training field. As a second method, a pilot is allocated at a un-used sub-carrier interval, and a phase error is calculated using the allocated pilot. As a third method, a pilot is allocated for a phase error of a preamble interval at the same position of a pilot used in a data interval.

Although the three methods have own advantages and disadvantages, the third method has an advantage of calculating a phase error without changing a preamble structure. Although the first method may have small noise influence because 256 sub-carriers are used to calculate a phase error, the third method may be comparatively weak to noise because four pilots are used. A receiver may reduce the noise influence by using all of information calculated from received signals from eight receiving antennas and controlling a bandwidth of a loop filter.

Figure 16:
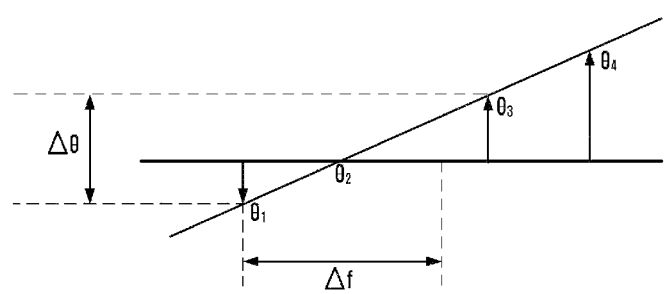
FIG. 16 is a diagram for describing phase error calculating using a pilot in accordance with an embodiment of the present invention.

FIG. 16 is a diagram for describing phase error calculating using a pilot in accordance with an embodiment of the present invention.

According to the third method described above, a receiver calculates a phase error caused by a sampling frequency offset using a pilot commonly disposed in a preamble interval and a data interval. Since channel information is not included in the preamble interval like a method for compensating for a carrier frequency offset, the same pilot is allocated to all of symbol intervals. However, it is necessary to have a symbol iterated at a frequency domain in order to compensate for a sampling frequency offset although a symbol iterated at a time domain is used to compensate for a carrier frequency offset.

$$s(t-\Delta T)F \rightarrow S(f)e^{j2\pi \Delta T f} \quad \text{Eq. 13}$$

As shown in Eq. 13, the receiver converts received data into a frequency domain through FFT and calculates a phase error using a pilot iterated at a frequency domain.

Four pilots are allocated in a data interval. It is possible to calculate both of a phase error caused by a sampling frequency offset and a phase error caused by a carrier frequency offset using four pilots disposed in the preamble interval at the same positions in the data interval. The phase error caused by the carrier frequency offset is appeared identically in all of frequency domains, and the phase error caused by the sampling frequency offset is appeared in proportion to a frequency. Eq. 14 shows the phase error caused by the carrier frequency offset, and Eq. 15 shows a phase slop by the sampling frequency offset.

$$\frac{1}{4}\sum_{i=1}^{4} \theta_i \quad \text{Eq. 14}$$

$$\frac{1}{2}\left(\frac{\theta_3 - \theta_1}{\Delta f} + \frac{\theta_4 - \theta_2}{\Delta f}\right) \quad \text{Eq. 15}$$

Therefore, two types of phase errors can be calculated using phase differences $\theta_1$, $\theta_2$, $\theta_3$, and $\theta_4$ calculated from the four pilots.

Figure 17:
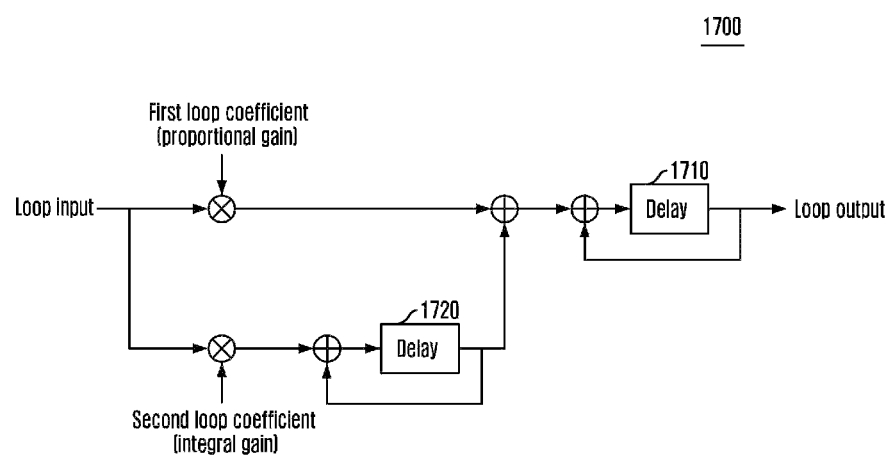
FIG. 17 illustrates a secondary loop filter 1700 in accordance with an embodiment of the present invention.

If pilots for calculating a phase error are disposed in a preamble interval at the same positions of the pilots used in a data interval as described above, the calculated phase error may not be accurate because of noise and interference between sub-carriers and because of using the four pilots. Therefore, a phase is compensated further accurately using a loop filter shown in FIG. 17. FIG. 17 illustrates a secondary loop filter 1700 in accordance with an embodiment of the present invention.

The loop filter 1700 operates as a low pass filter (LPF) using delays (memory) 1710 and 1720. Here, a bandwidth can be controlled by changing loop coefficients 1 and 2 through controlling a proportional gain and an integral gain of the loop filter 1700.

Figure 18:
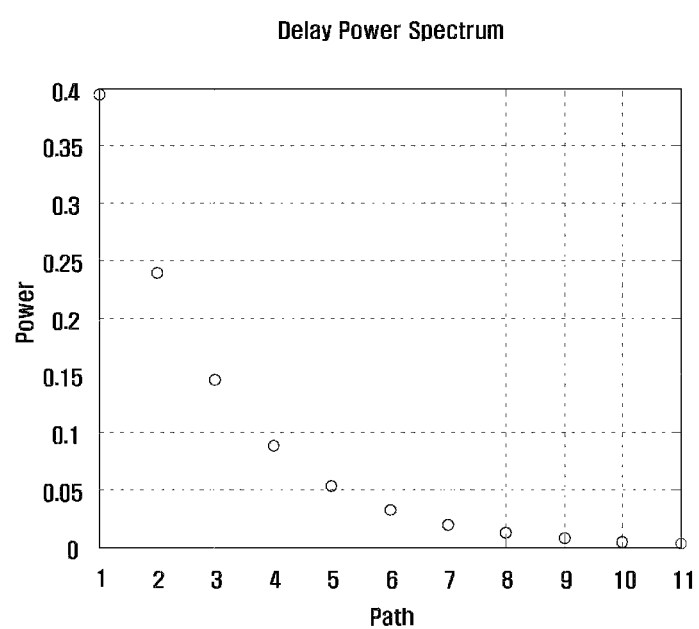
FIG. 18 is a graph of a delay power spectrum in accordance with an embodiment of the present invention.

FIG. 18 is a graph of a delay power spectrum in accordance with an embodiment of the present invention.

A channel of a wireless communication system according to the present embodiment may be a multi-path Rayleigh distributed channel. The characteristics of the multi-path channel are defined by RMS delay spread. The characteristics of the multi-path channel assume exponential decaying.

Eq. 16 is an equation for expressing delay power spectrum.

$$P(n) = \frac{1}{P_{sum}} e^{-\delta n} \quad \text{Eq. 16}$$

$$\delta = \frac{1}{\tau_{rms} \times f_s}$$

$$P_{sum} = \sum_{n=0}^{N} e^{-\delta n}$$

$$N = \frac{5 \times \tau_{rms}}{T_s} + 1$$

In Eq. 16, P(n) denotes a mean power according to a path. δ is a constant value of exponential decaying and may be expressed as a function by RMS delay spread and a sampling frequency. $P_{sum}$ is a constant value for normalization. N is the number of paths and is expressed by defining a coherence bandwidth as an inverse number for 5 times of RMS delay spread. FIG. 18 illustrates delay power spectrum with RMS delay spread of 50 ns, sampling frequency of 40 MHz, and 11 paths.

Figure 19:
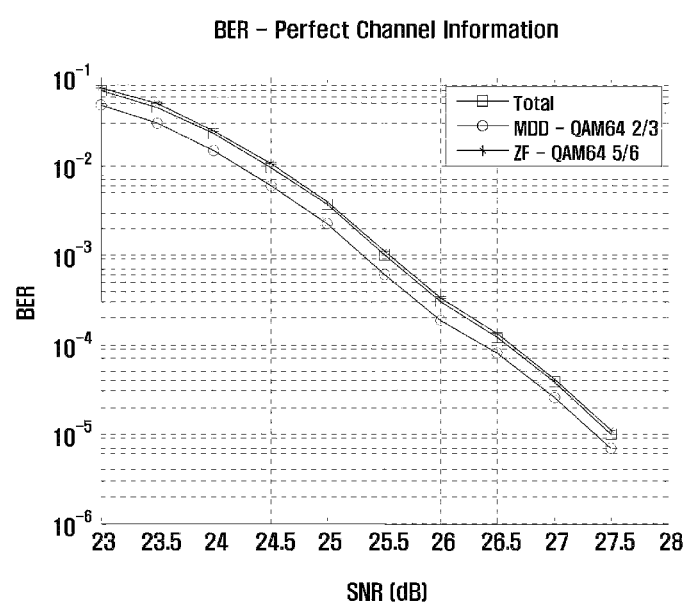
FIG. 19 is a graph of a bit-error rate for a signal-to-noise ratio (SNR).
Figure 20:
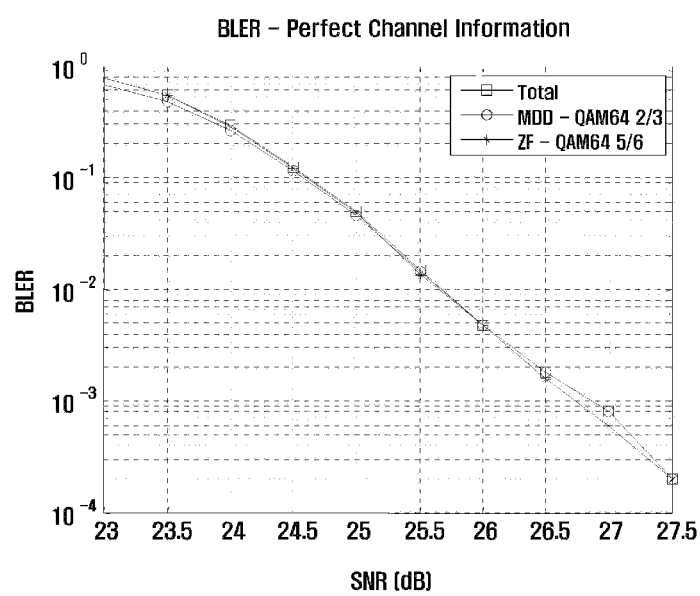
FIG. 20 is a graph of a block error rate for SNR.
Figure 21:
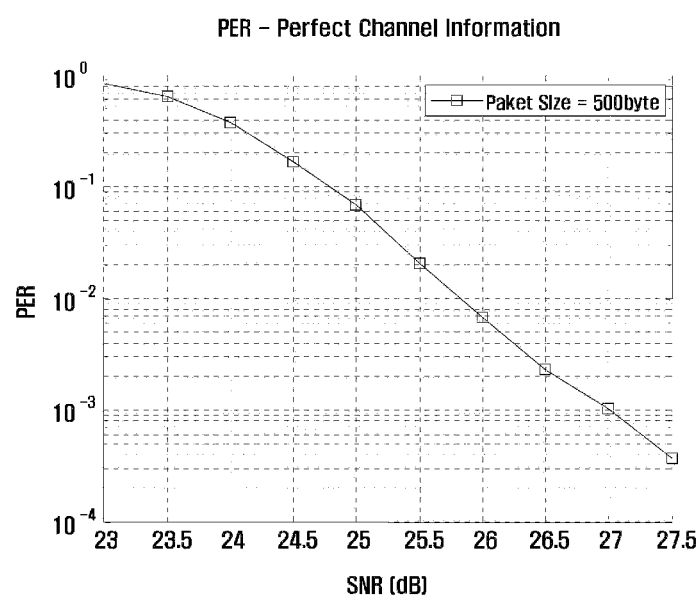
FIG. 21 is a graph of a packet error rate (PER) for SNR.

FIGS. 19 to 21 are graphs illustrating channel estimation performance in accordance with an embodiment of the present invention. FIG. 19 is a graph of a bit-error rate for a signal-to-noise ratio (SNR), and FIG. 20 is a graph of a block error rate for SNR, and FIG. 21 is a graph of a packet error rate (PER) for SNR.

A channel estimation method used in the simulation is Modular-B. A scrambler modulates original data by a generator function S(x) for security reason in a transmitter.

$$S(X) = x^7 + x^4 + 1 \quad \text{Eq. 17}$$

A scrambler like Eq. 17 may be used, or the same scrambler may be used in a transmitter and a receiver. Non-zero number may be used for initializing the scrambler. Also, a Pseudo Random Code may be used, and a bit sequence of 1011101 may be used as an initial state.

TABLE 1

| MCS Level | Modulation Type | | LDPC Code rate | | Data rate | Data Sub-carrier |
|---|---|---|---|---|---|---|
| | MDD | ZF | MDD | ZF | | |
| MCS2 | QAM64 | QAM64 | 2/3 | 5/6 | 3.60 Gbps | 228 |
| MCS3 | QAM16 | QAM64 | 3/4 | 5/6 | 3.42 Gbps | 228 |
| MCS5 | QAM16 | QAM64 | 1/2 | 2/3 | 2.64 Gbps | 228 |
| MCS8 | QPSK | QAM16 | 1/2 | 3/4 | 1.89 Gbps | 228 |
| MCS14 | QPSK | QPSK | 1/2 | 1/2 | 0.75 Gbps | 228 |
| MCS4 | QAM64 | QAM64 | 1/2 | 3/4 | 3.12 Gbps | 223 |
| MCS6 | QPSK | QAM16 | 3/4 | 5/6 | 2.85 Gbps | 228 |
| MCS7 | QAM16 | QAM16 | 1/2 | 3/4 | 2.07 Gbps | 228 |

RMS Delay Spread = 50 ns  
Number of Path = 11 tap  
Sampling Frequency = 40 MHz Eq. 18

A simulation is performed using an MIMO wireless communication system having four transmitting antennas and eight receiving antennas under the conditions shown in Table 1 and Eq. 18. As a result of the simulation, there is only 0.3 dB difference between no sampling frequency offset and a sampling frequency offset of 30 ppm as shown in FIGS. 19 to 21. That is, performance is significantly improved.

The apparatus and system may be embodied in hardware, software, or combination thereof. In case of hardware, a module for channel estimation may be embodied as one or more application-specific integrated circuits (ASIC), a digital signal processor (DSP), a programmable logical device (PLD), a field programmable gate array (FPGAP), a processor, a controller, a micro-controller, a microprocessor, other electric units designed for performing the above-described functions, and combination thereof. The software can be embodied through a module that performs the above-described functions. Software codes may be stored in memory units and executed by a processor. The memory units may be embodied internal or external space of the processor. In this case, the memory may be connected to the processor through well-known various methods.

As described above, the preamble structure and the channel estimation algorithm according to the present invention enable channel estimation to be effectively performed for M×N paths in an MIMO wireless communication system having M transmitting antennas and N receiving antennas. Particularly, the channel estimation can be performed without dropping overall performance which is caused by a timing offset in regardless of the number of antennas.

The method of the present invention described above may be programmed for a computer. Codes and code segments constituting the computer program may be easily inferred by a computer programmer of ordinary skill in the art to which the present invention pertains. The computer program may be stored in a computer-readable recording medium, i.e., data storage, and it may be read and executed by a computer to realize the method of the present invention. The recording medium includes all types of computer-readable recording media.

While the present invention has been described with respect to the specific embodiments, it will be apparent to those skilled in the art that various changes and modifications may be made without departing from the spirit and scope of the invention as defined in the following claims.

What is claimed is:

1. A communication method of a transmitter for channel estimation in a Multiple Input Multiple Output (MIMO) wireless communication system having N receiving antennas, comprising:
    generating a preamble interval having a short training field for compensating for a carrier frequency offset, wherein the short training field comprises a predetermined pattern iterated N−1 times and a reverse predetermined pattern positioned after the (N−1)th predetermined pattern on a time domain, wherein the short training field further comprises a guard interval at a front of the short training field, wherein the guard interval comprises at least one predetermined pattern and at least one reverse predetermined pattern positioned after the at least one predetermined pattern, wherein the predetermined pattern is formed of a first bit sequence, and wherein the reverse predetermined pattern is formed of the first bit sequence arranged in a reverse order; and
    transmitting a packet having the preamble interval.

2. The communication method of claim 1, wherein the preamble interval additionally includes more than two of identical consecutive long training fields at a time domain.

3. The communication method of claim 1, wherein in said transmitting a packet, the packet having the preamble interval is loaded on a plurality of subcarriers that orthogonally cross each other and the plurality of subcarriers with the packet are transmitted, and the long training field corresponding to at least 1/M of the plurality of subcarriers.

4. The communication method of claim 1, wherein the preamble interval includes a first long training field for compensating for a phase error caused by a sampling frequency offset and a second long training field for compensating for a carrier frequency offset, and the first long training field is identical to the second long training field.

5. A communication method of a transmitter for channel estimation in a Multiple Input Multiple Output (MIMO) wireless communication system having N receiving antennas, comprising:
    generating a preamble interval comprising a first pilot for compensating for a phase error caused by a sampling frequency offset, wherein the preamble interval further comprises a short training field, wherein the short training field comprises a predetermined pattern iterated N−1 times and a reverse predetermined pattern positioned after the (N−1)th predetermined pattern on a time domain, wherein the short training field further comprises a guard interval at a front of the short training field, wherein the guard interval comprises at least one predetermined pattern and at least one reverse predetermined pattern positioned after the at least one predetermined pattern, wherein the predetermined pattern is formed of a first bit sequence, and wherein the reverse predetermined pattern is formed of the first bit sequence arranged in a reverse order; and
    transmitting a packet having the preamble interval and a data interval.

6. The communication method of claim 5, wherein the preamble interval includes a long training field,
    in said transmitting a packet, the packet is loaded on a plurality of subcarriers that orthogonally cross each other and transmitted,
    a pilot for channel estimation is allocated in the long training field corresponding to at least 1/M of the plurality of subcarriers, and
    the first pilot for compensating for a phase error caused by a sampling frequency offset is allocated in the long training field.

7. The communication method of claim 5, wherein,
    the data interval includes a second pilot for channel estimation, and
    the first pilot is allocated in the preamble interval in the same position as the second pilot is allocated in the data interval.

8. A communication method of a transmitter for channel estimation in a Multiple Input Multiple Output (MIMO) wireless communication system having N receiving antennas, comprising:
    generating a preamble interval including more than two identical long training fields consecutive on a time domain in order to compensate for a carrier frequency offset, wherein the preamble interval further comprises a short training field for compensating for a carrier frequency offset, wherein the short training field comprises a predetermined pattern iterated N−1 times and a reverse predetermined pattern positioned after the (N−1)th predetermined pattern on a time domain, wherein the short training field further comprises a guard interval at a front of the short training field, wherein the guard interval comprises at least one predetermined pattern and at least one reverse predetermined pattern positioned after the at least one predetermined pattern, wherein the predetermined pattern is formed of a first bit sequence, and wherein the reverse predetermined pattern is formed of the first bit sequence arranged in a reverse order; and
    transmitting a packet having the preamble interval.

9. A communication method of a transmitter for channel estimation in a Multiple Input Multiple Output (MIMO) wireless communication system having M transmitting antennas, comprising:

generating a preamble interval having a long training field and a short training field, wherein the short training field comprises a predetermined pattern iterated M−1 times and a reverse predetermined pattern positioned after the (M−1)th predetermined pattern on a time domain, wherein the short training field further comprises a guard interval at a front of the short training field, wherein the guard interval comprises at least one predetermined pattern and at least one reverse predetermined pattern positioned after the at least one predetermined pattern, wherein the predetermined pattern is formed of a first bit sequence, and wherein the reverse predetermined pattern is formed of the first bit sequence arranged in a reverse order; and loading a packet having the preamble interval on a plurality of subcarriers that orthogonally cross each other and transmitting the packet, wherein a pilot for channel estimation is allocated in the long training field corresponding to at least 1/M subcarriers among the plurality of subcarriers.

10. A communication method of a receiver for channel estimation in a Multiple Input Multiple Output (MIMO) wireless communication system having N receiving antennas, comprising:

receiving a packet including a preamble interval having a short training field, wherein the short training field comprises a predetermined pattern repeatedly arranged N−1 times and a reverse predetermined pattern positioned after the (N−1)th predetermined pattern on a time domain, wherein the short training field further comprises a guard interval at a front of the short training field, wherein the guard interval comprises at least one predetermined pattern and at least one reverse predetermined pattern positioned after the at least one predetermined pattern, wherein the predetermined pattern is formed of a first bit sequence, and wherein the reverse predetermined pattern is formed of the first bit sequence arranged in a reverse order; and compensating for a carrier frequency offset using more than two of the patterns.

* * * * *